(12) United States Patent
Ballard et al.

(10) Patent No.: US 8,332,437 B2
(45) Date of Patent: *Dec. 11, 2012

(54) METHOD AND SYSTEM FOR CUSTOMIZING A USER INTERFACE TO AN ON-DEMAND DATABASE SERVICE

(75) Inventors: Alan Ballard, Vancouver (CA); Doug Chasman, Pittsford, NY (US); Eric Bezar, Oakland, CA (US); Mary Scotton, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,087

(22) Filed: Nov. 9, 2011

(65) Prior Publication Data

US 2012/0054633 A1 Mar. 1, 2012

Related U.S. Application Data

(63) Continuation of application No. 11/866,888, filed on Oct. 3, 2007.

(60) Provisional application No. 60/828,005, filed on Oct. 3, 2006.

(51) Int. Cl.
*G06F 17/30* (2006.01)

(52) U.S. Cl. ...................................... 707/795
(58) Field of Classification Search ............... 707/795
See application file for complete search history.

(56) References Cited

U.S. PATENT DOCUMENTS

| | | | | |
|---|---|---|---|---|
| 5,838,918 A * | 11/1998 | Prager et al. | ............... | 709/221 |
| 5,897,635 A * | 4/1999 | Torres et al. | ............... | 1/1 |
| 6,081,788 A * | 6/2000 | Appleman et al. | ......... | 705/14.46 |
| 6,101,486 A * | 8/2000 | Roberts et al. | ............. | 705/14.66 |
| 6,249,291 B1 * | 6/2001 | Popp et al. | ..................... | 345/473 |
| 6,313,835 B1 * | 11/2001 | Gever et al. | .................... | 715/846 |
| 6,336,132 B2 * | 1/2002 | Appleman et al. | ............ | 709/203 |
| 6,336,138 B1 * | 1/2002 | Caswell et al. | ................ | 709/223 |
| 6,629,081 B1 * | 9/2003 | Cornelius et al. | ............... | 705/30 |
| 6,647,422 B2 * | 11/2003 | Wesinger et al. | ............. | 709/228 |
| 7,000,184 B2 * | 2/2006 | Matveyenko et al. | ........ | 715/235 |
| 7,069,271 B1 * | 6/2006 | Fadel et al. | .................. | 705/26.7 |
| 7,080,083 B2 * | 7/2006 | Kim et al. | ..................... | 715/236 |
| 7,146,564 B2 * | 12/2006 | Kim et al. | ..................... | 715/235 |
| 7,194,411 B2 * | 3/2007 | Slotznick et al. | ............. | 704/271 |
| 7,328,225 B1 * | 2/2008 | Beloussov et al. | .................. | 1/1 |
| 7,356,679 B1 * | 4/2008 | Le et al. | ............................ | 713/1 |
| 7,444,597 B2 * | 10/2008 | Perantatos et al. | ............ | 715/769 |
| 7,448,024 B2 * | 11/2008 | Breeden et al. | ............... | 717/125 |
| 7,480,910 B1 * | 1/2009 | Kuwamoto et al. | ........... | 718/102 |
| 7,493,304 B2 * | 2/2009 | Day et al. | .............................. | 1/1 |
| 7,590,685 B2 * | 9/2009 | Palmeri et al. | ................ | 709/203 |

(Continued)

OTHER PUBLICATIONS

U.S. Appl. No. 60/828,192, filed Oct. 4, 2006.

(Continued)

*Primary Examiner* — Mark Andrew X Radtke
(74) *Attorney, Agent, or Firm* — Zilka-Kotab, PC

(57) ABSTRACT

In embodiments, methods and systems for customizing a user interface to an on-demand database service. These mechanisms and methods for customizing a user interface to an on-demand database service can enable embodiments to provide a user interface designed by a tenant of the on-demand database service. The customization can include including third party content into the customized user interface, overriding a standard object, and providing content inline at a specified location.

20 Claims, 11 Drawing Sheets

U.S. PATENT DOCUMENTS

| | | | |
|---|---|---|---|
| 7,624,342 B2 * | 11/2009 | Matveyenko et al. | 715/255 |
| 7,698,398 B1 * | 4/2010 | Lai | 709/223 |
| 7,739,351 B2 * | 6/2010 | Shkvarchuk et al. | 709/217 |
| 7,831,693 B2 * | 11/2010 | Lai | 709/220 |
| 8,069,435 B1 * | 11/2011 | Lai | 717/106 |
| 8,078,698 B2 * | 12/2011 | Moore | 709/220 |
| 2001/0011304 A1 * | 8/2001 | Wesinger et al. | 709/227 |
| 2001/0039594 A1 * | 11/2001 | Park et al. | 709/311 |
| 2002/0049702 A1 * | 4/2002 | Aizikowitz et al. | 707/1 |
| 2002/0095442 A1 * | 7/2002 | Hunter et al. | 707/513 |
| 2002/0138301 A1 * | 9/2002 | Karras et al. | 705/2 |
| 2003/0023641 A1 * | 1/2003 | Gorman et al. | 707/530 |
| 2003/0120671 A1 * | 6/2003 | Kim et al. | 707/100 |
| 2003/0120686 A1 * | 6/2003 | Kim et al. | 707/200 |
| 2004/0078371 A1 * | 4/2004 | Worrall et al. | 707/9 |
| 2004/0088706 A1 * | 5/2004 | Wesinger et al. | 718/105 |
| 2004/0103322 A1 * | 5/2004 | Wesinger et al. | 713/201 |
| 2004/0148576 A1 * | 7/2004 | Matveyenko et al. | 715/530 |
| 2004/0162719 A1 * | 8/2004 | Bowyer | 704/1 |
| 2004/0167989 A1 * | 8/2004 | Kline et al. | 709/245 |
| 2005/0044197 A1 * | 2/2005 | Lai | 709/223 |
| 2005/0223022 A1 | 10/2005 | Weissman et al. | |
| 2005/0229101 A1 * | 10/2005 | Matveyenko et al. | 715/530 |
| 2005/0289536 A1 * | 12/2005 | Nayak et al. | 717/174 |
| 2006/0123010 A1 * | 6/2006 | Landry et al. | 707/10 |
| 2006/0136490 A1 * | 6/2006 | Aggarwal et al. | 707/103 R |
| 2006/0224697 A1 * | 10/2006 | Norris | 709/218 |
| 2006/0259503 A1 * | 11/2006 | Bradateanu et al. | 707/102 |
| 2007/0006262 A1 * | 1/2007 | Cleron et al. | 725/42 |
| 2007/0028244 A1 * | 2/2007 | Landis et al. | 718/108 |
| 2007/0078950 A1 * | 4/2007 | Hopkins et al. | 709/217 |
| 2007/0100834 A1 * | 5/2007 | Landry et al. | 707/10 |
| 2007/0143353 A1 * | 6/2007 | Chen | 707/200 |
| 2007/0298719 A1 * | 12/2007 | Sproule et al. | 455/66.1 |
| 2008/0010243 A1 * | 1/2008 | Weissman et al. | 707/2 |
| 2008/0077566 A1 * | 3/2008 | Fell et al. | 707/4 |
| 2008/0086479 A1 * | 4/2008 | Fry et al. | 707/10 |
| 2008/0086482 A1 * | 4/2008 | Weissman | 707/10 |
| 2008/0127348 A1 * | 5/2008 | Largman et al. | 726/24 |
| 2008/0183687 A1 * | 7/2008 | Law | 707/4 |
| 2008/0201118 A1 * | 8/2008 | Luo | 703/2 |
| 2009/0037572 A1 * | 2/2009 | Gebhart et al. | 709/224 |
| 2010/0223301 A1 * | 9/2010 | Shkvarchuk et al. | 707/803 |
| 2010/0306536 A1 * | 12/2010 | Brouk et al. | 713/168 |
| 2011/0283356 A1 * | 11/2011 | Fly et al. | 726/22 |
| 2012/0054632 A1 | 3/2012 | Ballard et al. | |

OTHER PUBLICATIONS

Non-Final Office Action from U.S. Appl. No. 13/293,085, dated Mar. 16, 2012.

* cited by examiner

METHOD AND SYSTEM FOR CUSTOMIZING A USER INTERFACE TO AN ON-DEMAND DATABASE SERVICE

CLAIM OF PRIORITY

This application claims the benefit of U.S. Provisional Application Ser. No. 60/828,005 entitled "METHOD AND SYSTEM FOR CUSTOMIZING A USER INTERFACE TO AN ON-DEMAND DATABASE SERVICE," by Allan Ballard et al., filed Oct. 3, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to customizing a user interface, and more particularly to customizing a user interface to an on-demand database service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Changes to the interface with such a conventional interface are typically made by the information systems (IS) department, which maintains the database. However, in an on-demand database service that is hosted by another entity and/or that has multiple tenants, such a model of implementing customized changes does not provide the ease of use and flexibility demanded by today's customers.

Accordingly, it is desirable to provide techniques enabling flexible customization of the user interface to improve the ease of use of the on-demand database service.

BRIEF SUMMARY OF INVENTION

In accordance with embodiments, there are provided mechanisms and methods for customizing a user interface to an on-demand database service. These mechanisms and methods for customizing a user interface to an on-demand database service can enable embodiments to provide a user interface designed by a tenant of the on-demand database service. The customization can include including $3^{rd}$ party content into the customized user interface, overriding a standard object, and providing content inline at a specified location. The ability of embodiments to provide customized user interfaces can enable a business (tenant) the freedom to have its employees access data from the on-demand database service in a convenient, robust, and efficient manner suited for the needs of that particular business.

In an embodiment and by way of example, a method for customizing a user interface to an on-demand database service that is subscribed to by a plurality tenants is provided. Each tenant has one or more users. One or more definitions of a customization of a user interface are received from a first of a plurality of tenants. At least one of the definitions includes a reference to content not stored in the on-demand database. The definitions are associated with information that is specific to the first tenant and that is stored in the on-demand database. A request for at least a portion of the information is received from a user of the first tenant. A user interface modified according to the definitions is sent to the user such that a customized user interface that includes a combination of the referenced content and the requested information is displayed to the user. In one embodiment, the referenced content is retrieved and combined with the tenant-specific information to form the modified user interface.

In another embodiment and by way of example, a method includes receiving, from a first of a plurality of tenants, one or more definitions of a customization of a user interface; and associating the definitions with information that is specific to the first tenant and that is stored in the on-demand database. At least one of the definitions defines an action on data in the on-demand database service. The at least one definition defining an action on data in the on-demand database service is bound to a pre-defined object that is standard to the user interface and that is displayed as part of the user interface when at least a portion of the information is displayed. The binding overrides a previous functionality of the pre-defined object. A request for at least a portion of the information is received from a user. A user interface modified according to the definitions is sent to the user. An activation of the pre-defined object is received. The defined action is then performed on the data. In one embodiment, the action is a query on the data in the on-demand database service.

In another embodiment and by way of example, a method includes receiving, from a first of a plurality of tenants, one or more definitions of a customization of a user interface. At least one of the definitions includes a reference to content. The definitions are associated with information that is specific to the first tenant and that is stored in the on-demand database. An indication of a location where the referenced content is to appear on a particular page of the user interface is received. A request for at least a portion of the information is received from the user. A user interface modified according to the definitions is sent to the user such that a customized user interface that includes a combination of the referenced content and the requested information is displayed to the user. The referenced content is displayed at the indicated location. In one embodiment, the indication of the location is received from a pointing device.

Other embodiments of the invention are directed to systems and computer readable media associated with methods described herein, as well as methods for transmitting program code for creating the computer readable medium and/or cause one or more processors to perform methods described herein.

According to one aspect of the present invention, a method is provided for customizing a user interface to an on-demand database service. The method typically includes receiving at least one definition of a user interface customization embodied as an Scontrol, associating the at least one definition with user specific information in the on-demand database service, and presenting a user interface modified according to the at least one definition when a user having access to the user interface customization accesses the user interface.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings, like reference numbers indicate identical or functionally similar elements. Although the following figures depict various examples of the invention, the invention is not limited to the examples depicted in the figures.

DETAILED DESCRIPTION OF THE INVENTION

General Overview

Systems and methods are provided for controlling access to custom objects in a database system. These techniques for customizing a user interface allow each tenant of an on-demand database service according to their own needs.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing controlling access to custom objects in a database system will be described with reference to example embodiments.

System Overview

Figure 1:
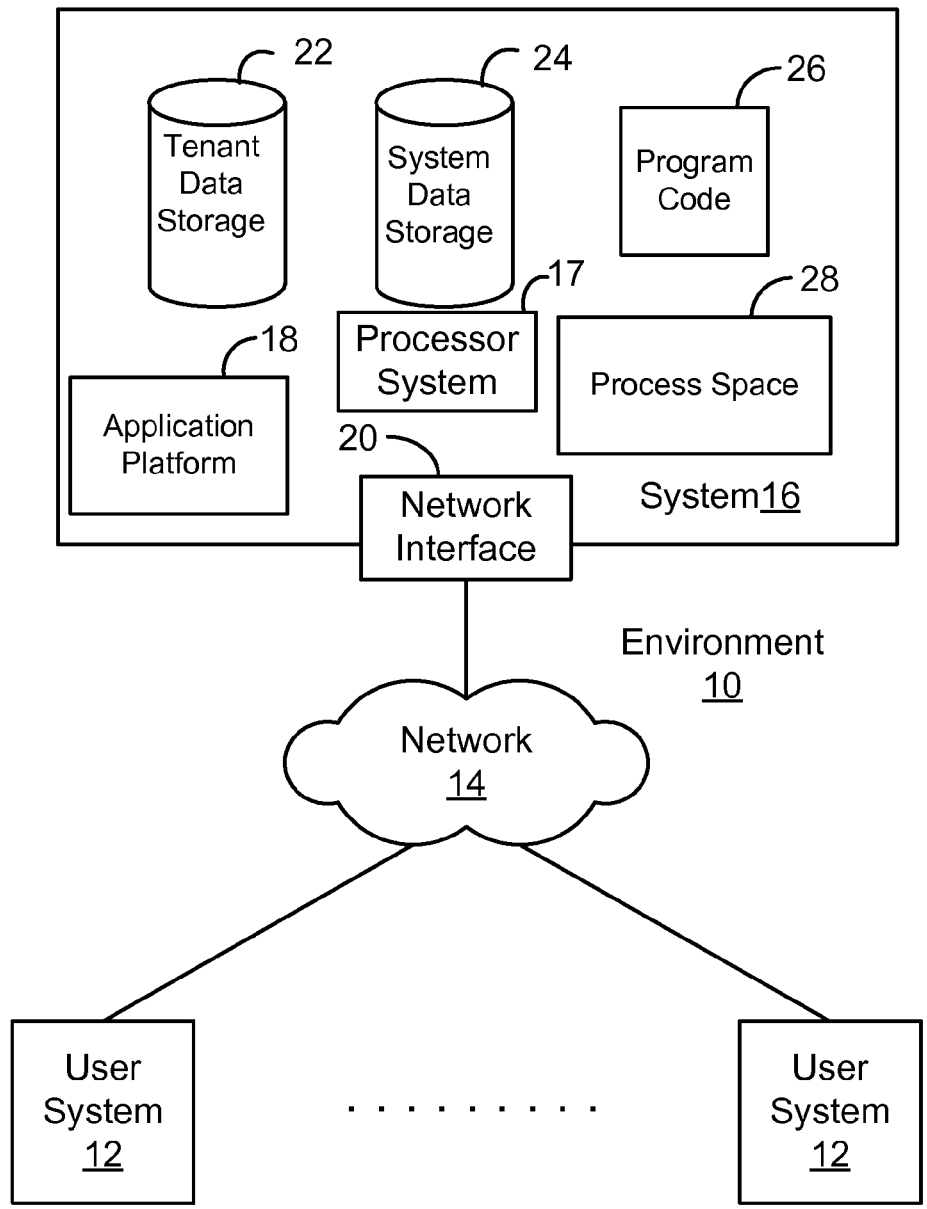
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
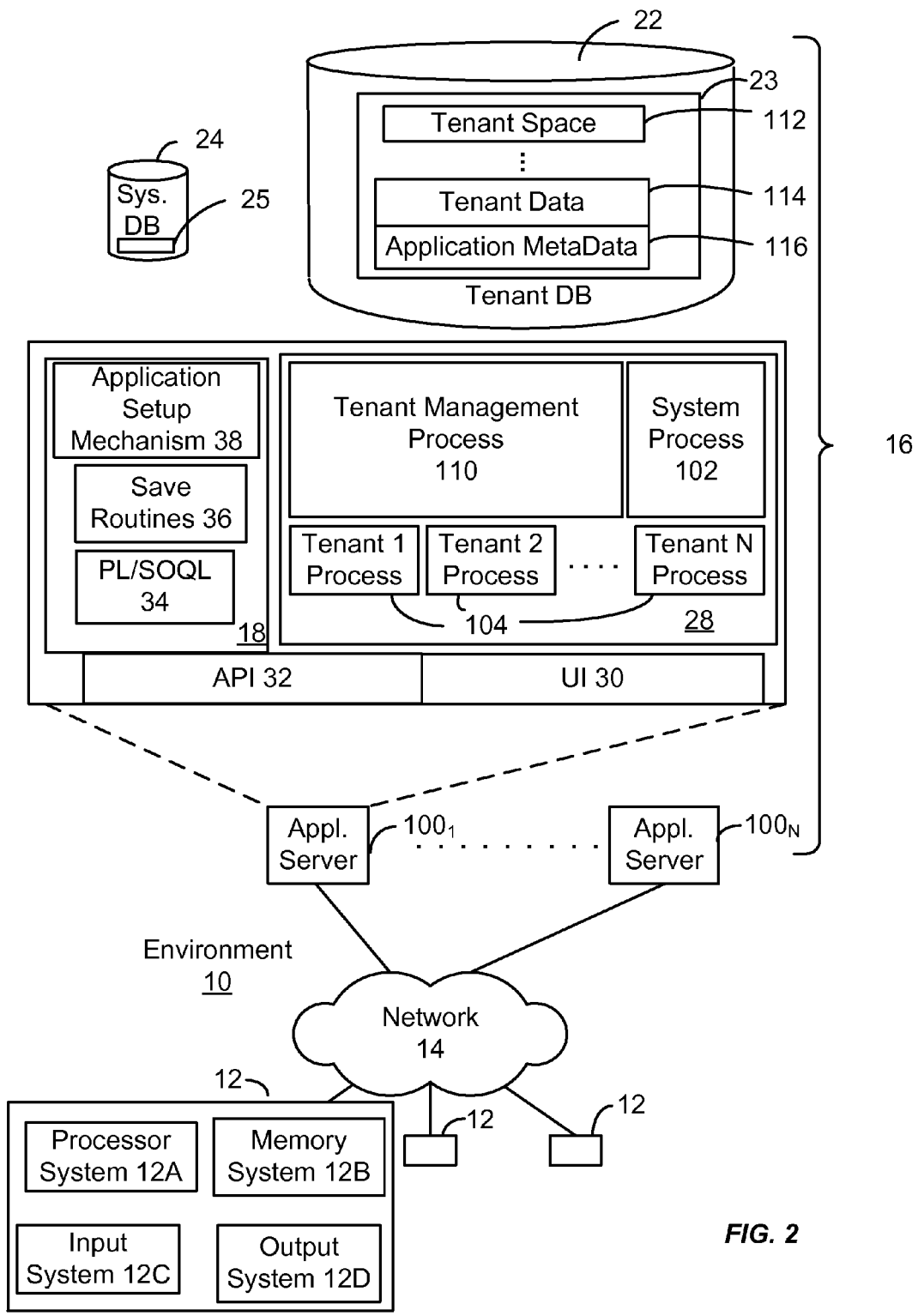
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain aspects, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Embodiments provide further customization features. Not all of the tenants may want to view and access data in the same way. Additionally, tenants may want to include content, such as additional account data, images, or any other data, in the user interface that the users of that tenant are able to see. Such customization are explained in detail below.

User Interface Customizations

As each tenant may be performing a different type of business, which can entail different types of data and needs, each tenant may want to change a standard user interface differently. By way of example, a tenant or a specific user of the tenant may want a little different look, different set of controls, and/or extra actions.

Figure 3:
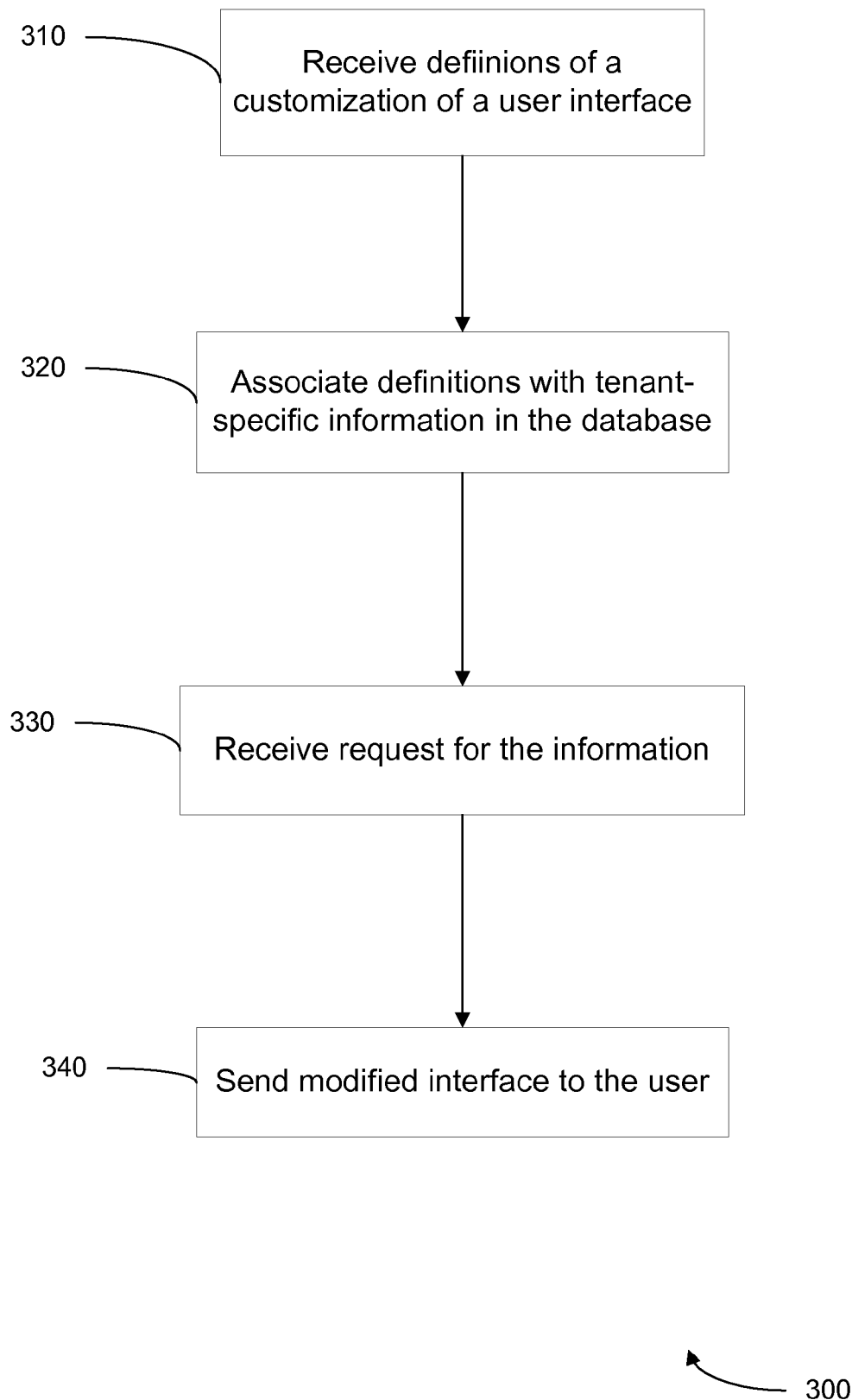
FIG. 3 is a flowchart of a method for customizing a user interface to an on-demand database service in an embodiment.

FIG. 3 is a flowchart of a method 300 for customizing a user interface to an on-demand database service in an embodiment. In step 310, the on-demand database service, such as system 16, receives one or more definitions of a customization of a user interface from a tenant. The definitions may be received in any suitable format (e.g. interactive application or file upload) and across any suitable medium or network connection, e.g. using the Internet.

In one embodiment, at least one of the definitions includes a reference to content, which may not be stored in the on-demand database. By way of example, the content may include account information stored at a tenant's server and/or may include one or more images(such as a map), stock information, reports, or other data that is stored at a server of a third party. In one aspect, a container (herein termed an Scontrol) contains the definitions for a particular customization. In another embodiment, at least one of the definitions defines a query for data to be retrieved from the on-demand database service In step 320, the definitions are associated with information that is specific to the tenant and that is stored in the on-demand database. In one aspect, the definitions are associated to information that the definition directly references. In another aspect, the association of the information may be based on a relation between the locations of the definitions and the information as they are to appear in a customized user interface displayed to an end user. Such a relation may be done for inlining, which will be described in detail later.

In step 330, a request is received, from a user, for at least a portion of the information. In one embodiment, the request is made by an action that pulls up a main page for the user. The information can be any of the information normally associated with the unmodified user interface. In another embodiment, the request is made with a query to the database for certain data. By way of example, such a request may be made using a custom or overridden button.

In step 340, the on-demand database service sends, to the user, a user interface modified according to the definitions. In one embodiment, as a result, a customized user interface that includes a combination of referenced content and the requested information is displayed to the user. The combining of the referenced content and the requested information may be done at a user's device or at the on-demand server, or a combination of the two.

Figure 4:
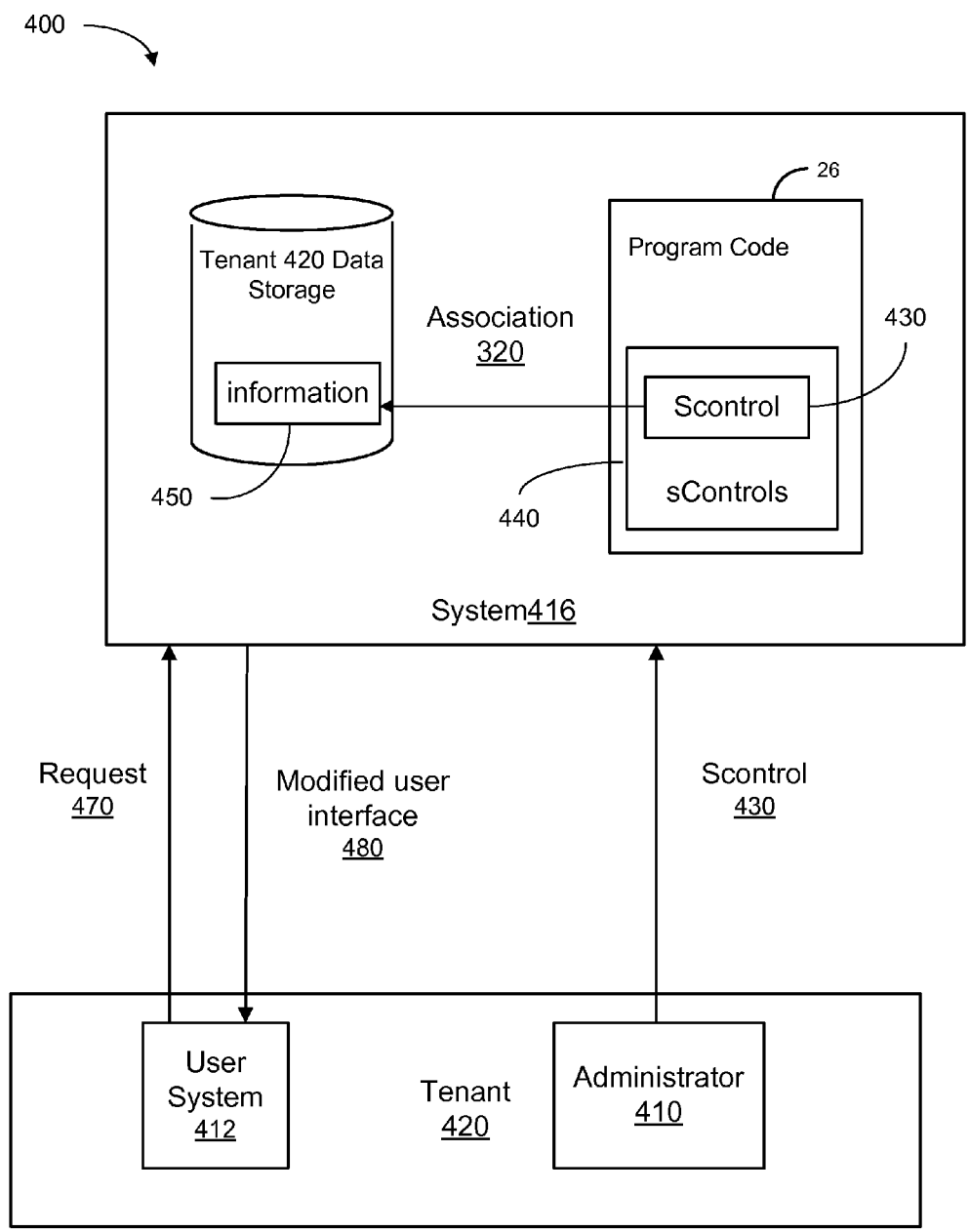
FIG. 4 is a block diagram illustrating the operation of the on-demand database service when customizing a user interface in an embodiment.

FIG. 4 is a block diagram 400 illustrating the operation of the on-demand database service when customizing a user interface in an embodiment. The operation of method 300 is now described in relation to diagram 400.

An administrator 410 creates one or more definitions of a customization of the user interface of tenant 420. In one embodiment, the definitions are input into a single container, such as an Scontrol 430. An S-control is a generic container for content, such as web-based content. In this case, an administrator is any user that has rights to define an Scontrol. An administrator would typically be a worker in the IS department of tenant 420.

Scontrol 430 is sent from a system of the administrator 410 to a database system 416 (such as system 16), e.g. during step 310 of method 300. In one embodiment, the Scontrol is placed within or interacts with the program code 26 that can generate a user interface the on-demand database service. In one aspect, Scontrol 430 may be placed within program code 26 at a particular point. In another aspect, Scontrol 430 may reside within a module 440 holding all Scontrols, and only a reference to the Scontrol is placed at a particular point in program code 26. Such interaction may happen when a user requests a user interface that has been modified by the Scontrol. In another embodiment, the Scontrol is placed within another metadata database of system 416 or within a cache server of system 416.

Figure 5:
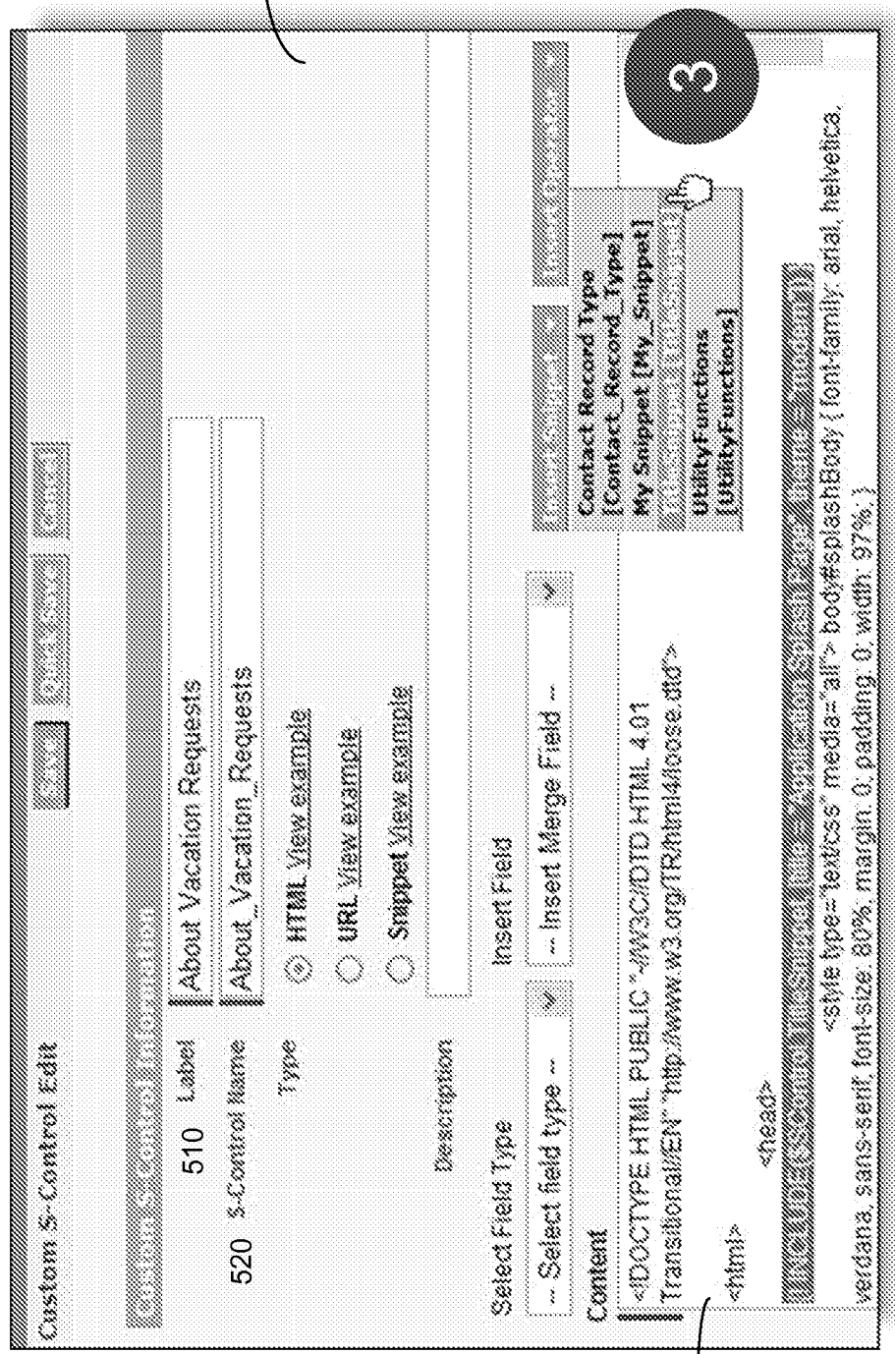
FIG. 5 shows a window for defining an Scontrol in an embodiment.

FIG. 5A shows a window 500 for defining an Scontrol in an embodiment. Edit page 500 of FIG. 5 may be used by the administrator 410 to create the Scontrol. A label 510 signifying a common usage for the Scontrol may be defined. The label may reflect translations into other languages. A name 520 as used by the software code may be used to reference the code and distinguish it from other Scontrols.

In one embodiment, the Scontrol may be defined to be of types: HTML code, a URL, or a snippet, which is a reference to other code. Administrator 410 can enter HTML code or a URL directly in content box 530. Pick (pulldown) lists such as a select field type or insert field may be used to easily bring up a definition or link to certain tenant data, e.g., to which the Scontrol may be associated. Picklists for inserting a snippet allow the insertion of previously defined code (such as HTML, Javascript, other machine independent code, or other code) to be inserted into a content box 530 or otherwise used as the Scontrol. In this manner, an Scontrol (or essentially a reference to an Scontrol) that is written once can be easily be inserted or incorporated into other Scontrols. Thus, a change in the Scontrol gets propagated to all places that a reference (or Snippet) appears.

Referring back to FIG. 4, once the Scontrol is received by system 16, the Scontrol can be associated with certain tenant-specific data, e.g. in step 320 of method 300. In the example shown, information 450 of tenant 420 that is stored in the tenant data storage is associated with Scontrol 430. The information may be, for example, all or some of the information of a specific account, which may appear on an account detail page. In one aspect, the data storage of tenant 420 is placed within the tenant storage 22.

In one aspect, which data is associated depends upon the definition of the Scontrol. For example, the Scontrol may access certain field fields and field types. In another aspect, which data is associated depends upon how the Scontrol is to be applied. For example, an Scontrol may remove a button that is associated with certain information. In one embodiment, the association is where to put the customization in a page, such as detail page.

A user system 412, such as user systems 12, sends a request 470, which is received by the database system 416. In one aspect, the request involves the information 450. For example, a user may want to view a particular account detail page, or view a list that is created by activating a button. In another aspect, the request is initiated by a user that is operating user system 412.

The database system 416 receives the request and modifies a user interface using an Scontrol associated with information 450 to create a modified user interface 480. The modified user interface 480 is sent to the user system 412 so that the user interface as customized by the definitions is displayed to the user. Examples of how a user interface can be customized will now be discussed.

Figure 6:
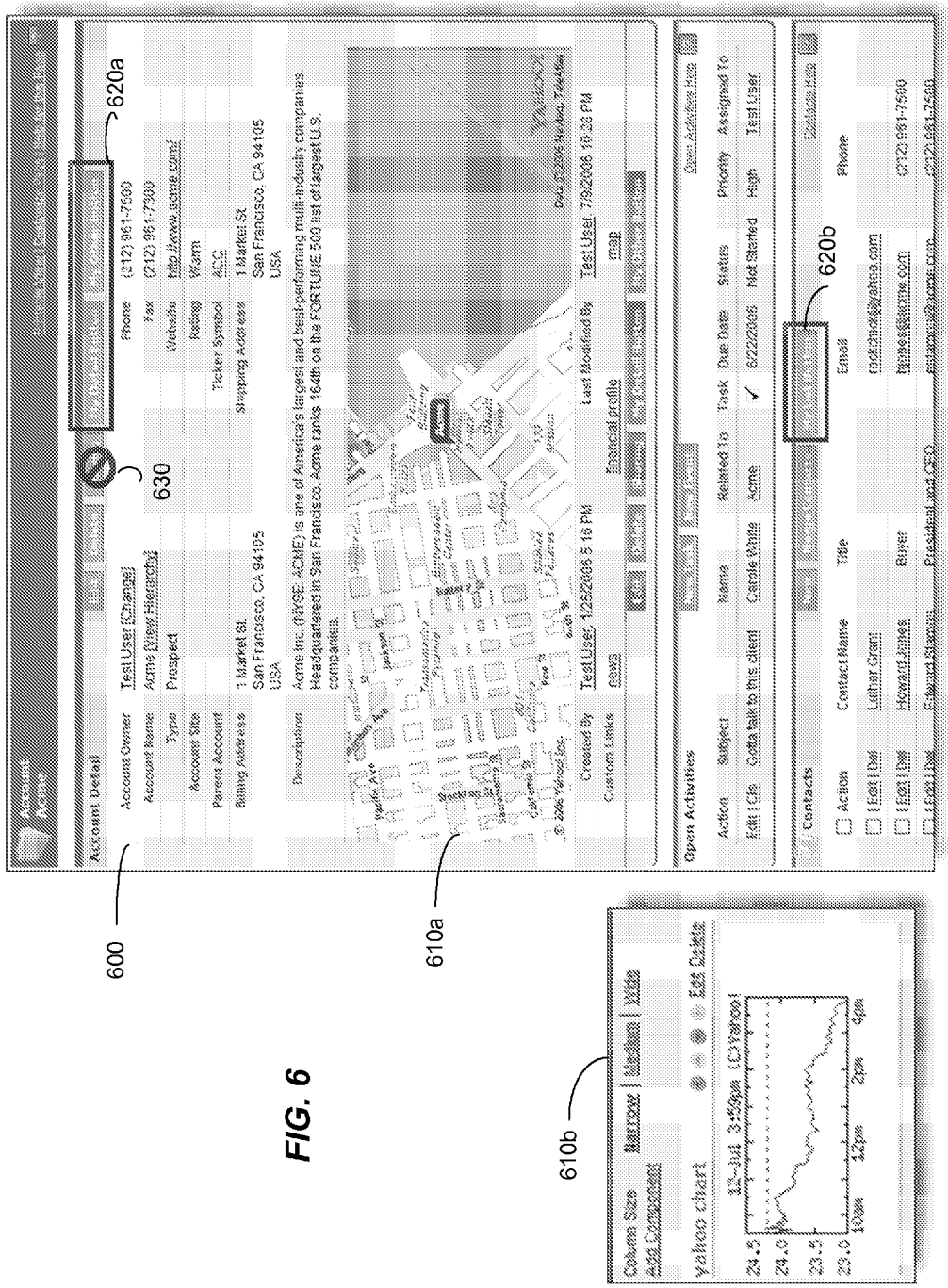
FIG. 6 illustrates examples of how an Scontrol may be applied to customize a user interface in an embodiment.

FIG. 6 illustrates examples of how an Scontrol may be applied to customize a user interface in an embodiment. Examples of customization include inline customization, custom buttons, removal of standard buttons, and the overriding of standard buttons.

Scontrols 610a and 610b are implemented as inline customization in a page. For example, the content within or referenced by an Scontrol can be applied or placed anywhere inline in a detail page 600. Content 610a is a map showing a place of business of an account Acme. In one embodiment, a mechanism is provided for specifying exactly where the inline content can be added into contact page. Such a mechanism may include defining a box or simply a point with a pointer or via commands.

As another example, the Scontrol can also be applied inline to a dashboard, which is a page or part of a page that supports graphs and other pictorials about a chosen entity. For, example an Scontrol used for inserting an up-to-date stock chart 610b on a specified company. Thus, an Scontrol can be used to add pieces to existing pages, display new section with new data, display old section with new data, or remove data that they did not want In another embodiment, the Scontrol can also be applied to pre-defined types of objects, such as a button. For example, an Scontrol can be used to create custom buttons 620. A detail page header/footer, related list, and add to list view are examples of places that a button may be added. In one aspect, a new button is added to the right of the standard buttons.

The customization may be used for presenting, for example, content from a specified URL of a third party or results of a specific query on the tenant's data stored in the on-demand database. As such, custom button 620b can be used to provide a query that returns a list as defined by the tenant, and similarly for custom buttons 620a. Accordingly, an Scontrol can define a behavior on a single object OR on multiple objects as appearing in a list.

A button may also be removed, e.g. button 630, or have its functionality changed or overridden. A detail page header/footer, a related list, and a list view are examples of places that a button may be removed. Removing a button may be done, for example, when a particular user or group of users are to not be allowed to access some features or data, or when a tenant does not have a need for a standard button. In one embodiment, the removing is done by hiding the button in the user interface, and does not disable the functionality.

An Scontrol can also override the functionality of a standard button, an entire page, such as a detail page, a user's home page, or any other standard page. In one embodiment, clicking on an overridden or added button displays Scontrol (such as URL) or runs the Scontrol (such as OnClick JavaScript). In another embodiment, activating an Scontrol can take an action on one record (e.g. Validate Address), create multiple records (e.g. Mass Task Create) and take an action on multiple records (e.g. Re-Open Cases). The custom button may work in conjunction with other features. For example, a custom or overridden list button can take the defined action on all of the selected rows.

In one embodiment, as for overriding a button, one can override the standard actions (such as New, Edit, View, Delete) and Override "mass actions" on lists (e.g. Add to Campaign, Add Products, Close cases). Overriding a button may be advantageous to "interrupt" standard page flow (e.g. to search for New Accounts) to override with new user interface interaction (e.g. to Drag & drop to add products).

Other examples of expanded functionality of buttons include mapping all related accounts using SOQL Relationships, opportunity summary, and sales vs. quota (e.g. dashboard components using Flash-based Scontrols). Advantages of the expanded functionality described herein include Eliminating manual order processing, centralizing forecasting, and creating on-demand pipeline visibility.

Figure 7:
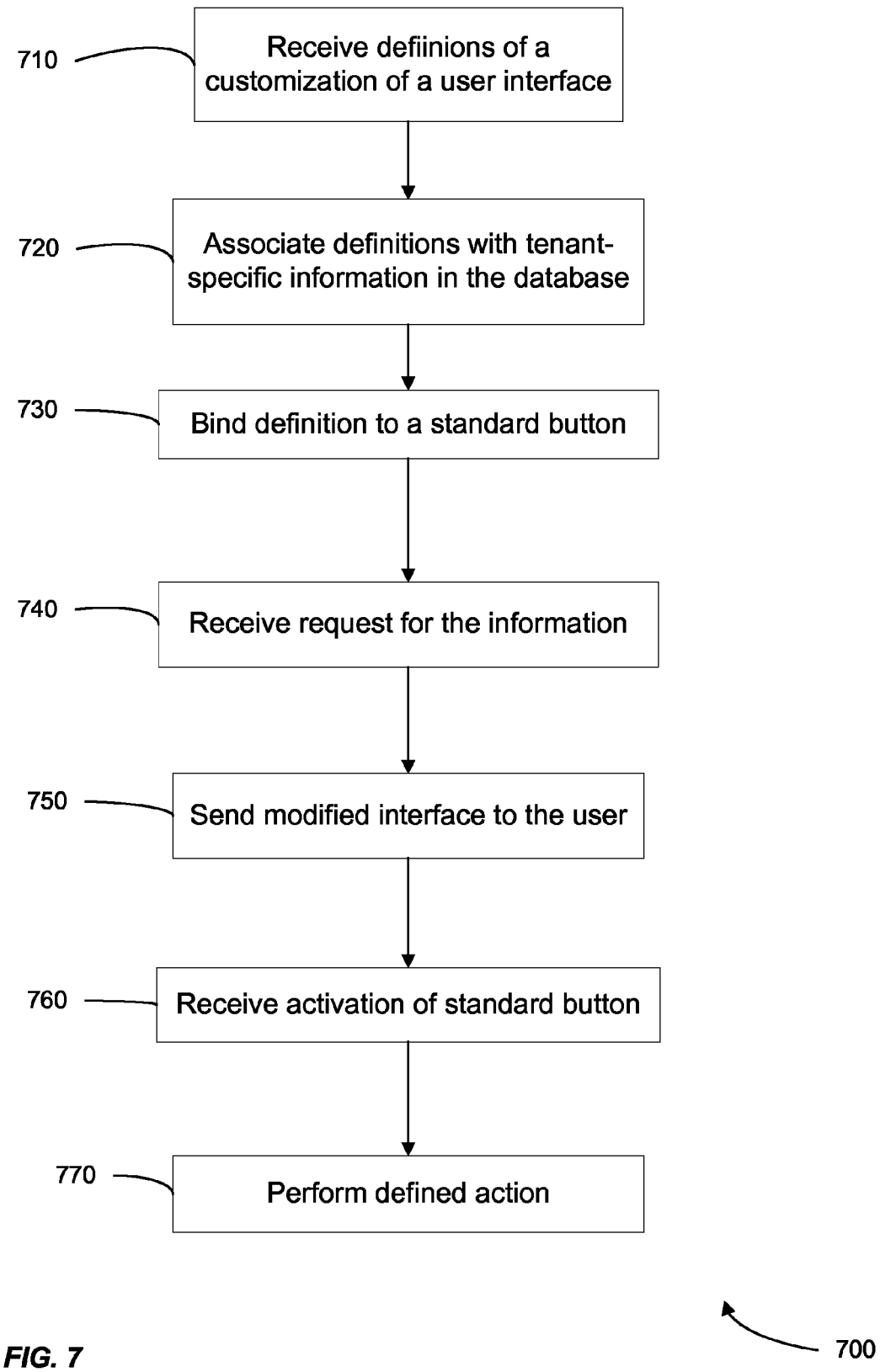
FIG. 7 is a flow diagram illustrating a method for overriding a functionality of a standard button to provide a customized user interface for an on-demand database service in an embodiment.

FIG. 7 is a flow diagram illustrating a method 700 for overriding a functionality of a standard button to provide a customized user interface for an on-demand database service in an embodiment. In step 710, the on-demand database service, such as system 16, receives one or more definitions of a customization of a user interface from a tenant. In step 720, the definitions are associated with information that is specific to the tenant and that is stored in the on-demand database. At least one of the definitions defines an action on data in the on-demand database service.

In step 730, at least one definition defining an action on data in the on-demand database service is bound to a standard button that is displayed as part of the user interface when at least a portion of the information is displayed. The binding of the definition effectively overrides the functionality of the standard button.

In step 740, a request for at least a portion of the information is received from the user. In step 750, a user interface modified according to the definitions is sent to the user, or equivalently a system being used by the user. In step 760, an activation of the standard button is received. For example, one may activate the button by clicking on to it. In step 770, the defined action on the data is performed by the on-demand database service.

Figure 8:
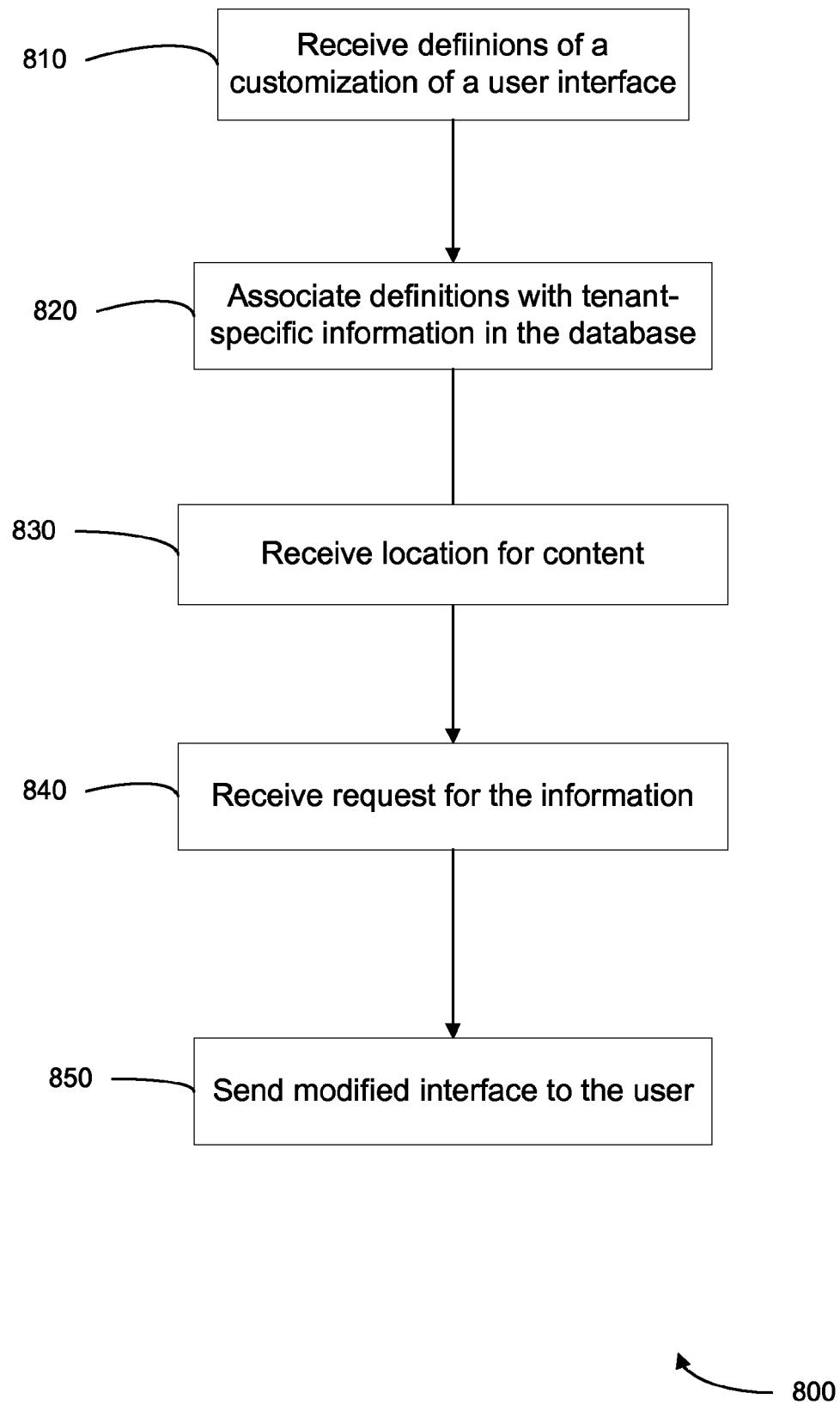
FIG. 8 is a flow diagram of a method for providing an inline customization of a user interface for an on-demand database service in an embodiment.

FIG. 8 is a flow diagram of a method 800 for providing an inline customization of a user interface for an on-demand database service in an embodiment. In step 810, the on-demand database service, such as system 16, receives one or more definitions of a customization of a user interface from a tenant. At least one of the definitions includes a reference to content. In step 820, the definitions are associated with information that is specific to the tenant and that is stored in the on-demand database.

In step 830, an indication of a location where the referenced content is to appear on a particular page of the user interface is received. The location may be chosen with mechanisms as described above. For example, a cursor may choose a specific point or a region. In step 840, request for at least a portion of the information is received from the user.

In step 850, a user interface modified according to the definitions is sent to the user such that a customized user interface that includes a combination of the referenced content and the requested information is displayed to the user. The customized user interface thus allows for introduction of the referenced content to be displayed at the indicated location.

Figure 9:
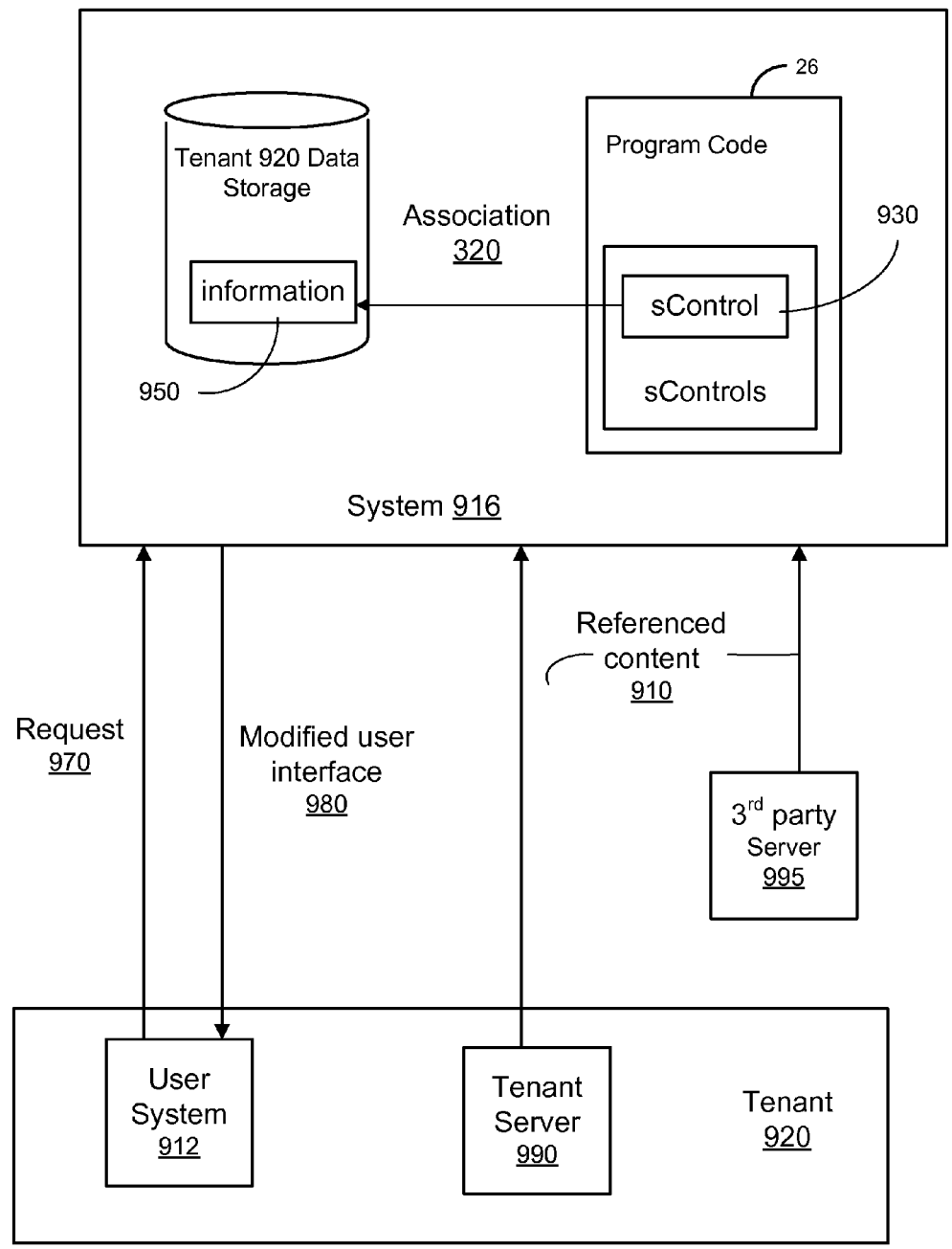
FIG. 9 is a block diagram illustrating the operation of the on-demand database service when customizing a user interface to combine external content in an embodiment.

FIG. 9 is a block diagram 900 illustrating the operation of an on-demand database service when customizing a user interface to combine external content in an embodiment. As discussed previously, an Scontrol 930 is submitted to the on-demand database system 916. The Scontrol can then be associated with information 950. Once a request 970 is received from user system 912, the system 916 can then send a modified user interface 980. In an embodiment, the on-demand database service combines the external content with the information 950 for sending as the modified user interface 980.

In one embodiment, the Scontrol 930 contains a reference to content 910 at the tenant's server 990. In one aspect, such content is HTML or other code. The code when combined with information 950, and potentially some of program code 26, from the on-demand database can create at least part of the customized user interface. Thus, essentially in practice, a tenant may have an application running on its own server that can access the data on the database system, although the access is instigated by first accessing the on-demand database service.

In another aspect, the referenced content 910 is account data or other proprietary data that the tenant 920 prefers to store at the tenant server 990. Thus, a tenant can aggregate the data stored at the on-demand database system 916 with other data, which may be stored locally. The access to the tenant's server 990 by system 916 may be controlled in any number of ways as is known to those skilled in the art.

In another embodiment, the Scontrol retrieves data from a 3rd party server 995 for inclusion into the modified user interface 980. Such data can then be placed, for example, inline into a page of the modified user interface or bound to the activation of a particular object on the page, such as a button. The modified user interface 980 can then be displayed to the user as customized user interface according to the definitions created by tenant 920.

Figure 10:
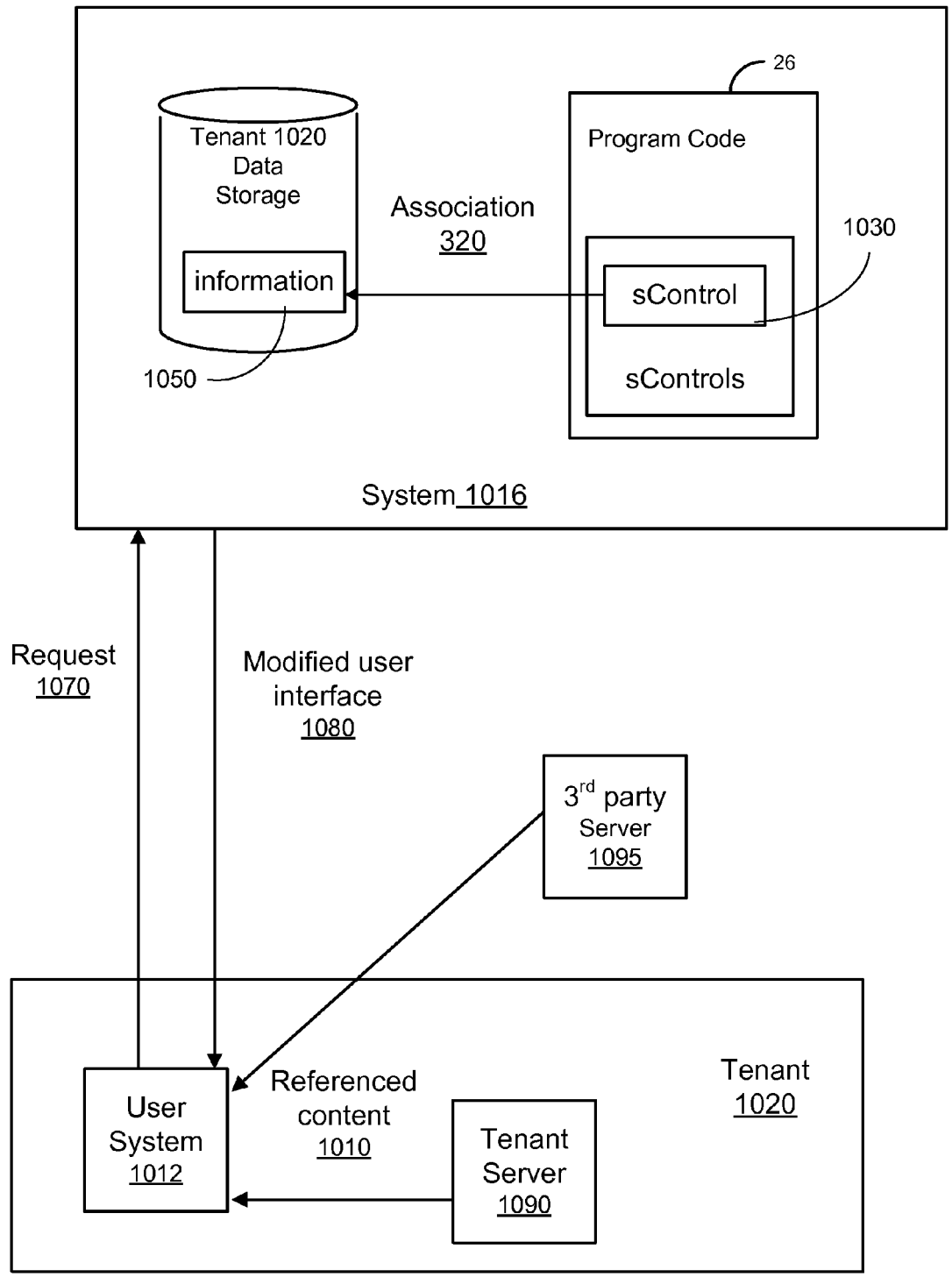
FIG. 10 is a block diagram 1000 illustrating the interaction of an on-demand database service with a user system that creates a customized user interface in an embodiment.

FIG. 10 is a block diagram 1000 illustrating the interaction of an on-demand database service with a user system that creates a customized user interface in an embodiment. In this embodiment, the user system combines the external data referenced within the user interface 1080 as modified by the Scontrol 1030.

For example, HTML code that defined part of the user interface may contain a reference to the external data in the $3^{rd}$ party server 1095 or tenant server 1090. The browser of the user system 1012 can then retrieve the referenced content 1010 and display the content where the reference appears in the modified user interface 1080.

Many Scontrols may be used throughout a user interface of a particular tenant. There may be times when an administrator or other developer at a tenant needs to know how a change to an Scontrol will be propagated throughout the user interface. Accordingly, embodiments provide methods for tracking such changes.

Figure 11:
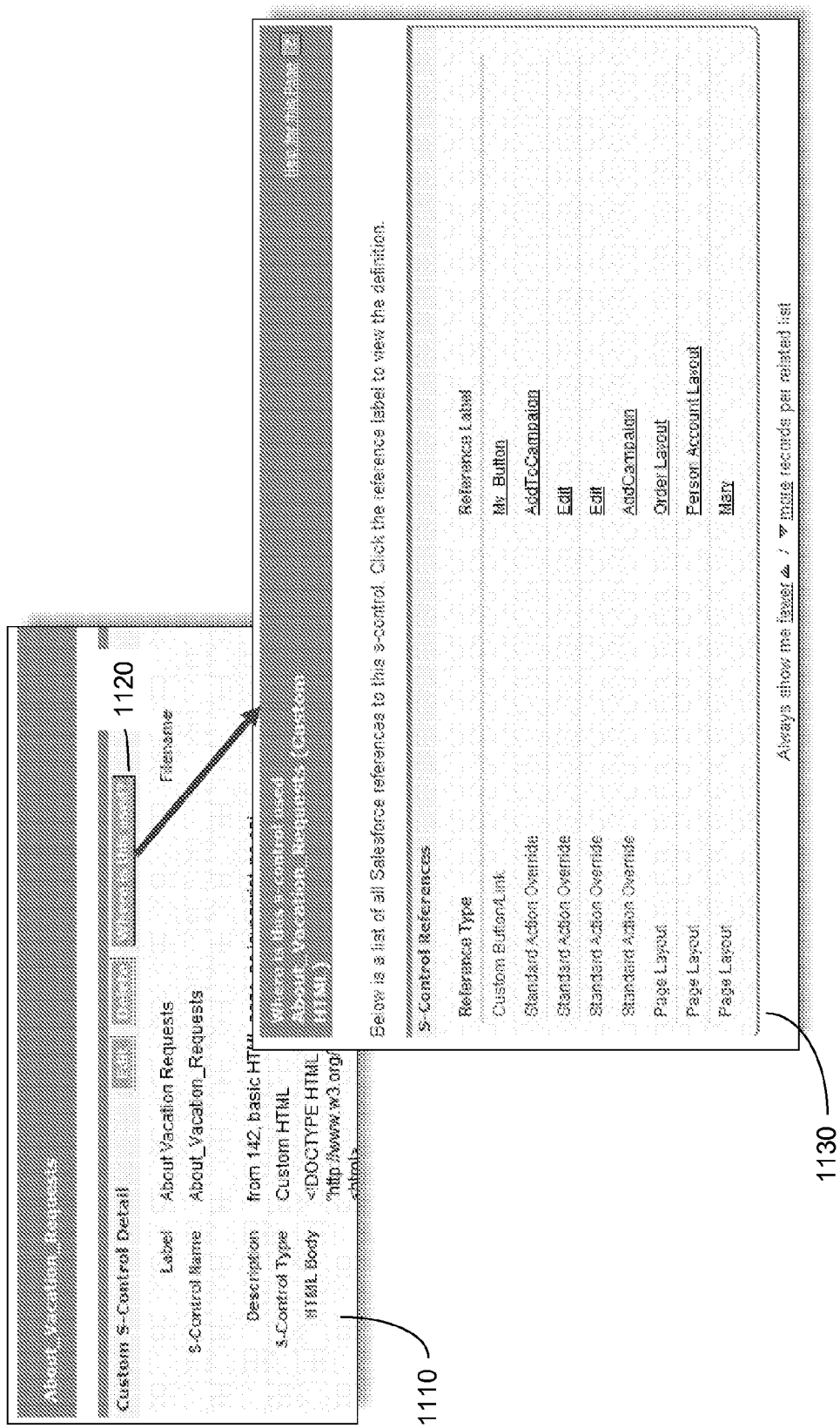
FIG. 11 shows a user interface for tracking Scontrols in an embodiment.

FIG. 11 shows a user interface for tracking Scontrols in an embodiment. Building a composite UI integrates content and applications from different sources in a seamless user interface, reducing the time it takes users to access the information they need to make business decisions, reducing the cost of web page development, and improving productivity.

The Scontrol detail page 1110 shows detail information for an Scontrol labeled About Vacation Requests. The button 1120 can be used to provide information for where this Scontrol is used. Scontrol reference page 1130 shows the result obtained from button 1120.

Such tracking of Scontrols allows the ability to identify all of the definitions that reference an Scontrol, e.g., for Scontrol Pages (such as custom HTML Scontrols and URL Scontrols) and for Scontrol Snippets. The tracking also allows for impact analysis when deleting an Scontrol, changing the type of Scontrol, and just figuring out where this Scontrol is currently used.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices. Thus, embodiments also provide methods of transmitting program code to one or more processors for implementing any of the methods mention herein.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a carrier signal carrying such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method, the method comprising:

receiving, from a first of a plurality of tenants, one or more customizations of a user interface, wherein at least one of the customizations is associated with content not stored utilizing an on-demand database that includes information stored therein;

associating the customizations with the first tenant;

storing the customizations in the on-demand database;

receiving, from a user associated with the first tenant, a request; and in response to the request, sending, to the user, the user interface modified according to the customizations, such that a customized user interface is displayed to the user which includes a combined utilization of the content and the information;

wherein the modified user interface is generated in response to the request from the user by program code interacting with the customizations;

wherein a first one of the customizations is for a language translation and is associated with web content of one or more third parties that is not stored utilizing the on-demand database, such that in response to a first request from the user for the web content of the one of the third parties specified by a URL of the one of the third parties:

sending, to the user, the user interface modified according to the first one of the customizations including the language translation of the web content of the one of the third parties specified by the URL of the one of the third parties.

2. The computer program product of claim 1, further comprising receiving, from the first tenant, how the customizations are to be applied, wherein which content is associated with each of the customizations depends on at least one of the definition or a selection of how the definition is to be applied.

3. The computer program product of claim 1, further comprising:

retrieving the content; and combining the content and the information to form the modified user interface.

4. The computer program product of claim 3, wherein the combination of the content and the information is created by a client application of the user.

5. The computer program product of claim 1, further comprising determining whether the user has access to the information, wherein only the information to which the user has access is sent in the modified user interface.

6. The computer program product of claim 1, wherein at least one of the customizations includes custom content that is hosted by the on-demand database service but executed by a client application of the user.

7. The computer program product of claim 1, wherein at least one of the customizations includes a reference to instructions for controlling an aspect of how the customized user interface is displayed, and further comprising receiving, from the first tenant, one or more other customizations of the user interface, wherein a reference to the instructions also appear in at least one of the other customizations received from the first tenant.

8. The computer program product of claim 7, wherein the instructions are stored at a server of the first tenant.

9. The computer program product of claim 1, wherein a modification from at least one of the customizations is displayed inline on a detail page when the customized user interface is displayed.

10. The computer program product of claim 1, wherein at least one of the customizations includes an addition of a custom button, tab, or link in the user interface.

11. The computer program product of claim 1, wherein at least one of the customizations includes an override of one or more standard buttons, tabs, or links in the user interface.

12. The computer program product of claim 1, wherein a second one of the customizations references a place of business and is associated with a map of the place of business provided by another one of the third parties, such that in response to a second request from the user: sending, to the user, the user interface modified according to the second one of the customizations by including the map of the place of business in the user interface.

13. A method, comprising:
receiving, from a first of a plurality of tenants, one or more customizations of a user interface, wherein at least one of the customizations is associated with content not stored utilizing an on-demand database that includes information stored therein;
associating the customizations with the first tenant;
storing the customizations in the on-demand database;
receiving, from a user associated with the first tenant, a request; and
in response to the request, sending, to the user, the user interface modified according to the customizations, such that a customized user interface is displayed to the user which includes a combined utilization of the content and the information;
wherein the modified user interface is generated in response to the request from the user by program code interacting with the customizations;
wherein a first one of the customizations is for a language translation and is associated with web content of one or more third parties that is not stored utilizing the on-demand database, such that in response to a first request from the user for the web content of the one of the third parties specified by a URL of the one of the third parties:
sending, to the user, the user interface modified according to the first one of the customizations including the language translation of the web content of the one of the third parties specified by the URL of the one of the third parties.

14. The method of claim 13, further comprising receiving, from the first tenant, how the customizations are to be applied, wherein which content is associated with each of the customizations depends on at least one of the definition or a selection of how the definition is to be applied.

15. The method of claim 13, further comprising:
retrieving the content; and
combining the content and the information to form the modified user interface.

16. The method of claim 15, wherein the combination of the content and the information is created by a client application of the user.

17. An apparatus, comprising:
a processor for:
receiving, from a first of a plurality of tenants, one or more customizations of a user interface, wherein at least one of the customizations is associated with content not stored utilizing an on-demand database that includes information stored therein;
associating the customizations with the first tenant;
storing the customizations in the on-demand database;
receiving, from a user associated with the first tenant, a request; and
in response to the request, sending, to the user, the user interface modified according to the customizations, such that a customized user interface is displayed to the user which includes a combined utilization of the content and the information;
wherein the modified user interface is generated in response to the request from the user by program code interacting with the customizations;
wherein a first one of the customizations is for a language translation and is associated with web content of one or more third parties that is not stored utilizing the on-demand database, such that in response to a first request from the user for the web content of the one of the third parties specified by a URL of the one of the third parties:
sending, to the user, the user interface modified according to the first one of the customizations including the language translation of the web content of the one of the third parties specified by the URL of the one of the third parties.

18. The apparatus of claim 17, wherein the processor is further for receiving, from the first tenant, how the customizations are to be applied, wherein which content is associated with each of the customizations depends on at least one of the definition or a selection of how the definition is to be applied.

19. The apparatus of claim 17, wherein the processor is further for:
retrieving the content; and
combining the content and the information to form the modified user interface.

20. The apparatus of claim 19, wherein the combination of the content and the information is created by a client application of the user.

* * * * *